(12) United States Patent
Pascoe

(10) Patent No.: US 10,343,737 B1
(45) Date of Patent: Jul. 9, 2019

(54) REUSABLE MAGNETIC DEVICE FOR TEMPORARY RETENTION OF A VEHICLE OPENING ELEMENT

(71) Applicants: AST Acme, Inc., Louisville, KY (US); Quadrant Magnetics, LLC, Louisville, KY (US)

(72) Inventor: Phil Pascoe, Floyds Knobs, IN (US)

(73) Assignees: AST ACME, INC., Louisville, KY (US); QUADRANT MAGNETICS, LLC, Louisville, KY (US)

( * ) Notice: Subject to any disclaimer, the term of this patent is extended or adjusted under 35 U.S.C. 154(b) by 130 days.

(21) Appl. No.: 15/241,936

(22) Filed: Aug. 19, 2016

Related U.S. Application Data

(60) Provisional application No. 62/208,219, filed on Aug. 21, 2015.

(51) Int. Cl.
*B62D 65/02* (2006.01)
*F16B 1/00* (2006.01)

(52) U.S. Cl.
CPC .............. *B62D 65/026* (2013.01); *F16B 1/00* (2013.01); *F16B 2001/0035* (2013.01)

(58) Field of Classification Search
CPC .. E05C 21/005; Y10S 269/904; Y10T 16/551; Y10T 29/53913; Y10T 29/53961; Y10T 29/53974; Y10T 29/53978; B25B 11/002; B25B 27/00; B25B 27/0035; B62D 65/026; E05B 15/0006; E05B 17/0004; E05B 17/06; E05B 79/04; E05B 85/045; F16B 1/00; F16B 2001/0035

USPC ................... 269/276, 8; 29/281.5; 33/DIG. 1
See application file for complete search history.

(56) References Cited

U.S. PATENT DOCUMENTS

| | | | | |
|---|---|---|---|---|
| 4,422,137 A | * | 12/1983 | Watts | F21V 15/04 248/206.5 |
| 4,593,946 A | | 6/1986 | Rich | |
| 4,876,786 A | * | 10/1989 | Yamamoto | B62D 65/14 29/281.4 |
| 5,692,264 A | | 12/1997 | van der Steur | |
| 5,971,379 A | * | 10/1999 | Leon, Jr. | B25B 11/002 228/212 |
| 6,006,635 A | * | 12/1999 | Stojkovic | B25B 27/0035 81/484 |
| 6,029,335 A | * | 2/2000 | Hui | B25B 27/0035 29/271 |
| 6,092,271 A | * | 7/2000 | Stojkovic | B25B 27/00 269/8 |
| 6,108,866 A | * | 8/2000 | Waynick, Jr. | B05B 13/0292 16/374 |
| 6,138,337 A | * | 10/2000 | Lezuch | E05B 17/06 29/407.05 |
| 6,279,218 B1 | * | 8/2001 | Lezuch | E05B 17/06 29/271 |

(Continued)

*Primary Examiner* — Joseph J Hail
*Assistant Examiner* — Arman Milanian
(74) *Attorney, Agent, or Firm* — Middleton Reutlinger

(57) ABSTRACT

A reusable magnetic device for temporary retention of a vehicle opening element in a closed position. The reusable magnetic device includes one or more magnets engaging at least one of the opening element and the fixed element of the vehicle in the closed position. The reusable magnetic device may include one or more pads to reduce the contact surface area between the device and either one or both of the opening element or fixed element.

5 Claims, 14 Drawing Sheets

(56) References Cited

U.S. PATENT DOCUMENTS

| | | | | |
|---|---|---|---|---|
| 6,324,948 B1* | 12/2001 | Kavc | B25B 27/0035 | |
| | | | 29/271 | |
| 7,784,751 B1* | 8/2010 | Bellows | A47B 91/02 | |
| | | | 248/188.2 | |
| 8,117,717 B2 | 2/2012 | Perche | | |
| 8,789,821 B2* | 7/2014 | Wong | B23K 37/0435 | |
| | | | 248/206.5 | |
| 8,858,013 B2* | 10/2014 | Attey | A47F 3/001 | |
| | | | 362/125 | |
| 8,955,891 B2* | 2/2015 | Millsap | E05C 17/025 | |
| | | | 16/82 | |
| 8,991,801 B2* | 3/2015 | Plaszewski | H01F 7/0252 | |
| | | | 248/206.5 | |
| 9,273,819 B2* | 3/2016 | Pinchevski | F16M 13/022 | |
| 2007/0063114 A1* | 3/2007 | Brumbaugh | G01D 5/34707 | |
| | | | 248/226.11 | |
| 2008/0118656 A1 | 5/2008 | Douglas et al. | | |
| 2009/0267355 A1 | 10/2009 | Perche | | |
| 2014/0265455 A1* | 9/2014 | Fulton | B60R 13/04 | |
| | | | 296/210 | |
| 2017/0018165 A1* | 1/2017 | Klein | G08B 21/187 | |

\* cited by examiner

REUSABLE MAGNETIC DEVICE FOR TEMPORARY RETENTION OF A VEHICLE OPENING ELEMENT

BACKGROUND OF THE INVENTION

1. Field of the Invention

The present embodiments relate to a reusable magnetic device for temporarily retaining an opening element relative to a fixed element of a vehicle body, and particularly, but is not limited to, a vehicle door relative to a vehicle body.

2. Description of Related Art

Various vehicle door retention clips have been proposed in the art for vehicles. More commonly, these clips are a single use clip and thrown away after using one time. Tools are usually used to assemble these clips to and from at least one of the fixed or opening elements. These clips are typically deformable by environmental conditions and by forces produced by closing the opening element such that the clips deflect out of position and subsequently deform back to create an interference relationship to hook the door to prevent the opening element from escaping back towards the open position. These clips then must be forced out of the interference relationship with the door in order to open the opening element.

There are several disadvantages associated with these deformable retention clips. These clips are typically a one-time use product and should not be reused. These clips may weaken or subsequently break because of sudden vehicle line stops, continuous line vibrations, and/or when an operator disengages the interference relationship to open the opening element or vehicle door. Replacement due to breaking may occur at various locations along the production line and would demand the operator to take time to replace. Instead of installation by hands, these clips may require additional tools to install and remove. The clips may also chip paint finish or contaminant due to surface wear. Further, these clips are typically used one time and considered wasteful since the operator cannot reuse the clip in the same process for another vehicle. This may result in undesirable additional cost of materials, labor, and time to replace the clips and repair any damage to the vehicle as a result of the clip's usage.

Thus there is a need to provide an embodiment of a device that may, but is not limited to, withstand forces applied on the line, be reusable, non-deformable, and/or reduce contamination and paint finish damage.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
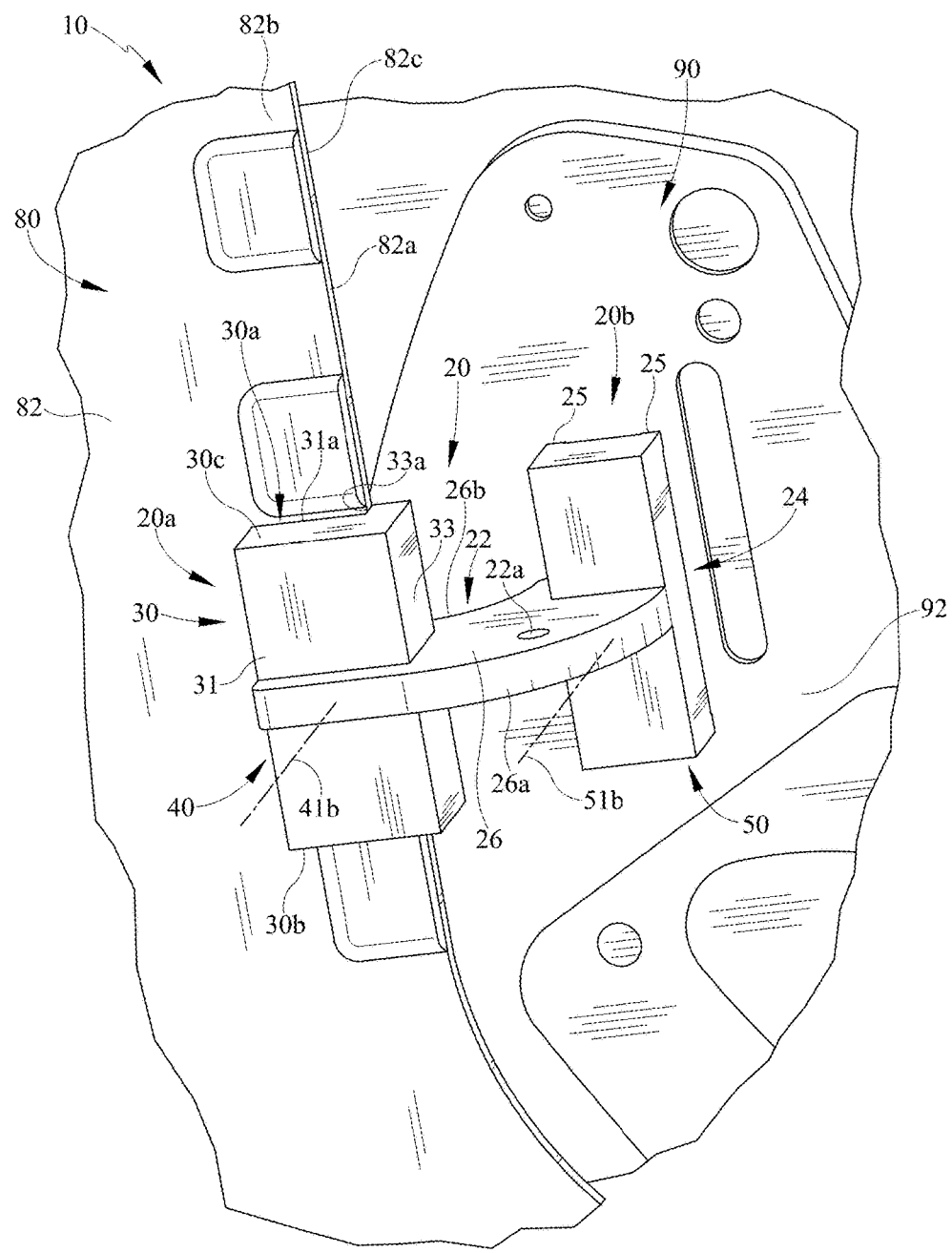
FIG. 1 is a perspective view of one embodiment of the reusable magnetic device installed on a vehicle with the vehicle door or opening element in the closed position illustrating both magnetic ends engaging their respective element.
Figure 2:
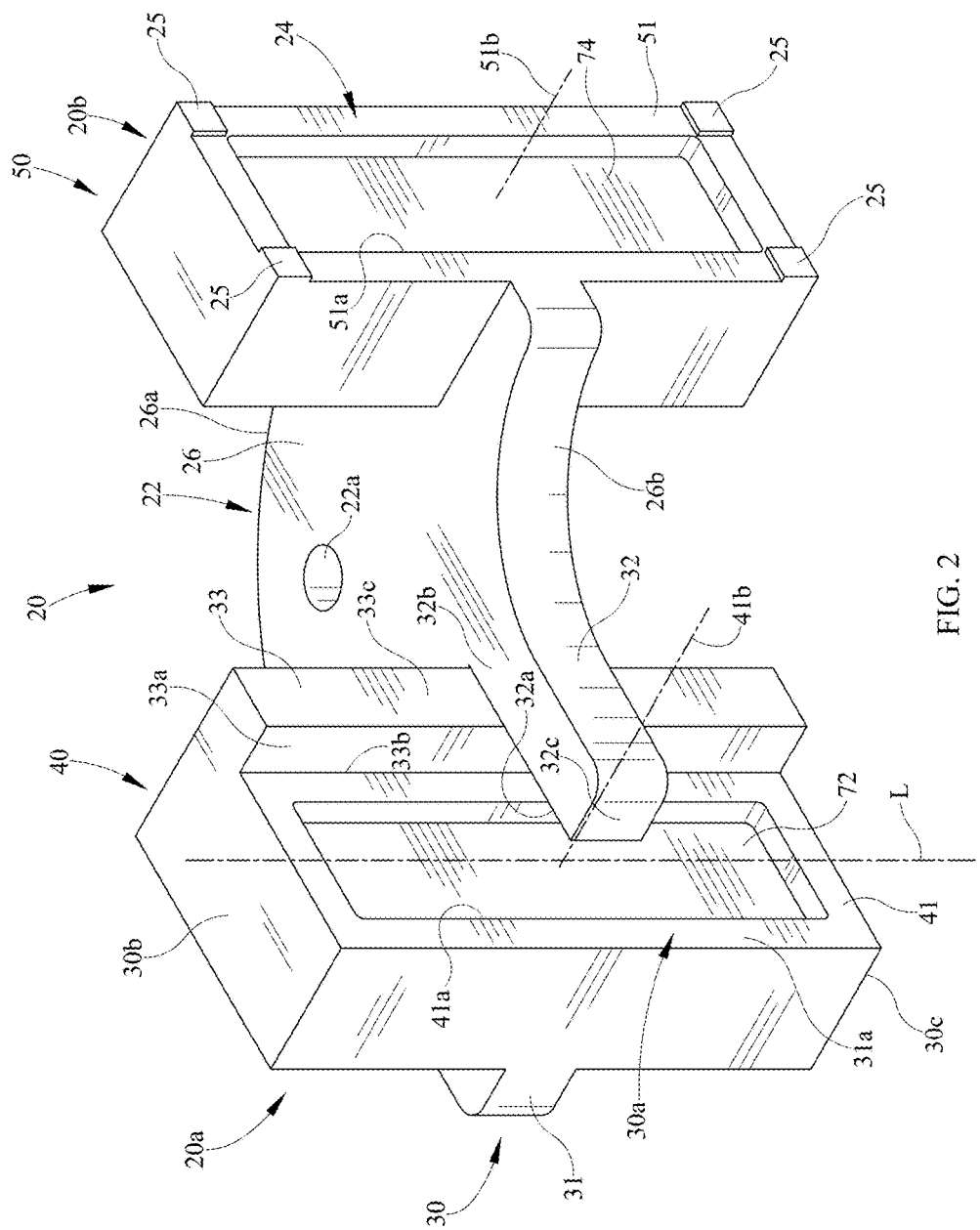
FIG. 2 is a perspective view of one embodiment of the reusable magnetic device of FIG. 1.
Figure 3:
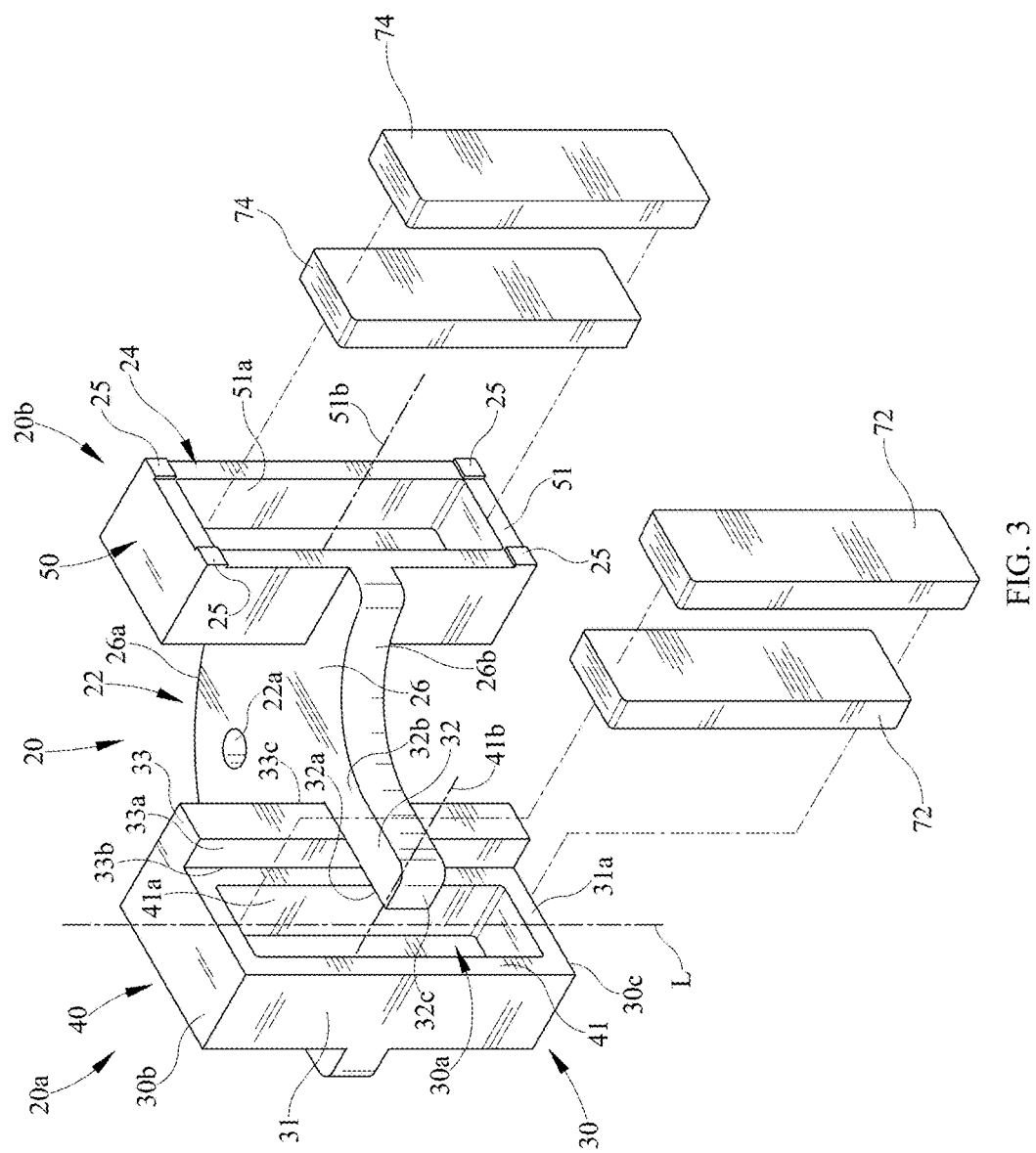
FIG. 3 is perspective view of the embodiment shown in FIG. 2 with the one or more magnets exploded away from their respective magnetic receptacle.
Figure 4:
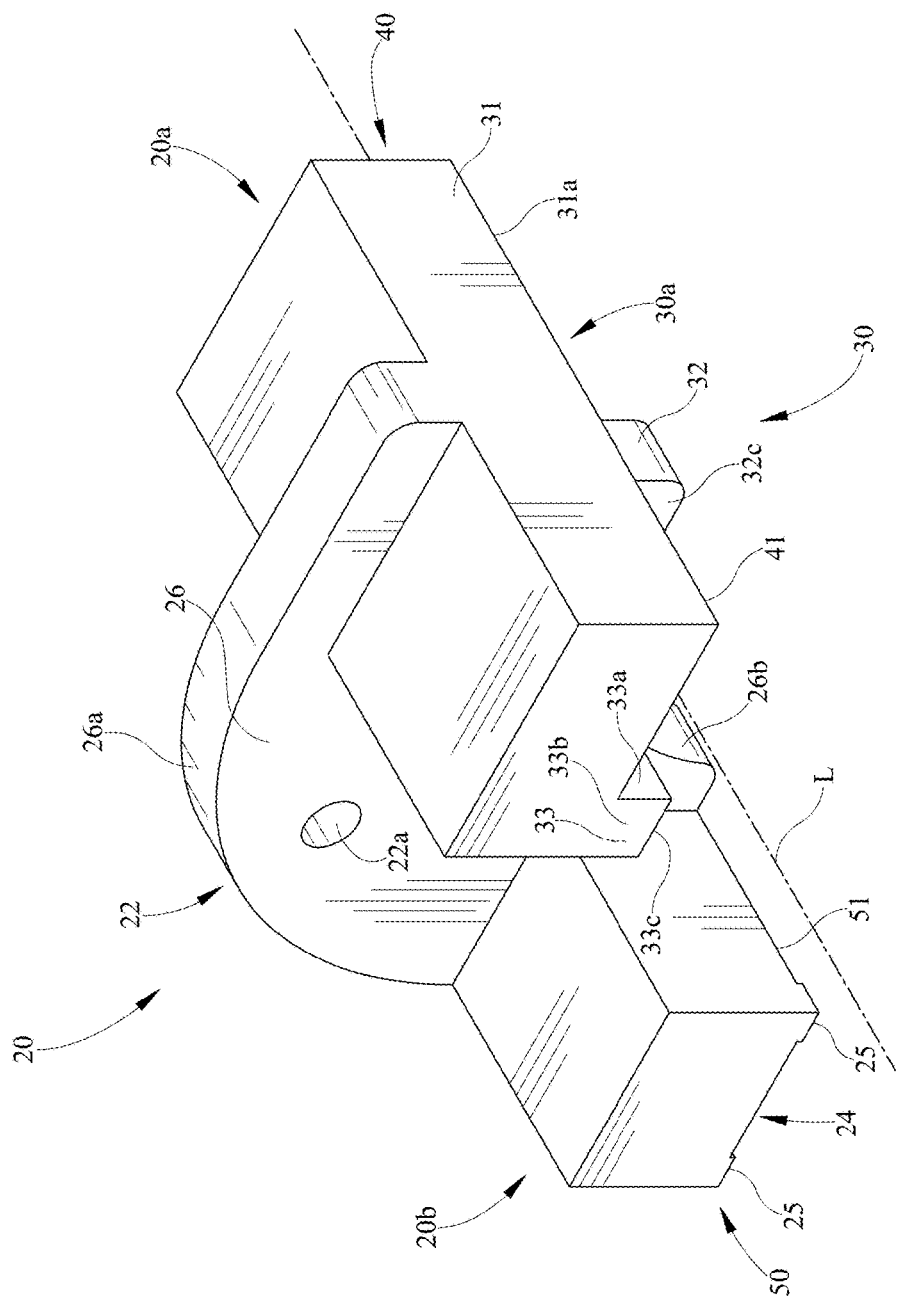
FIG. 4 another perspective view of the embodiment shown in FIG. 2.
Figure 5:
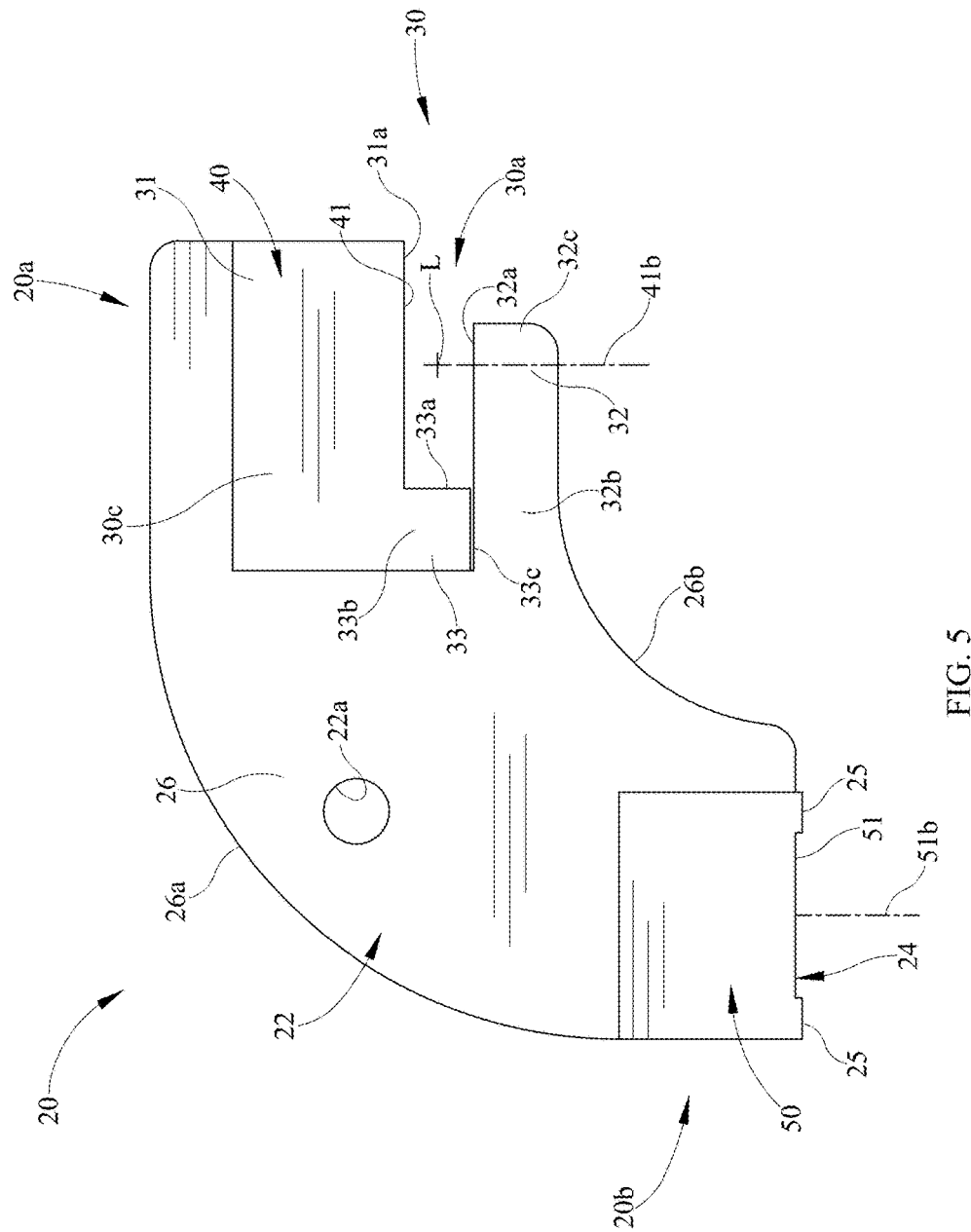
FIG. 5 is a side view of the embodiment of FIG. 2.
Figure 6:
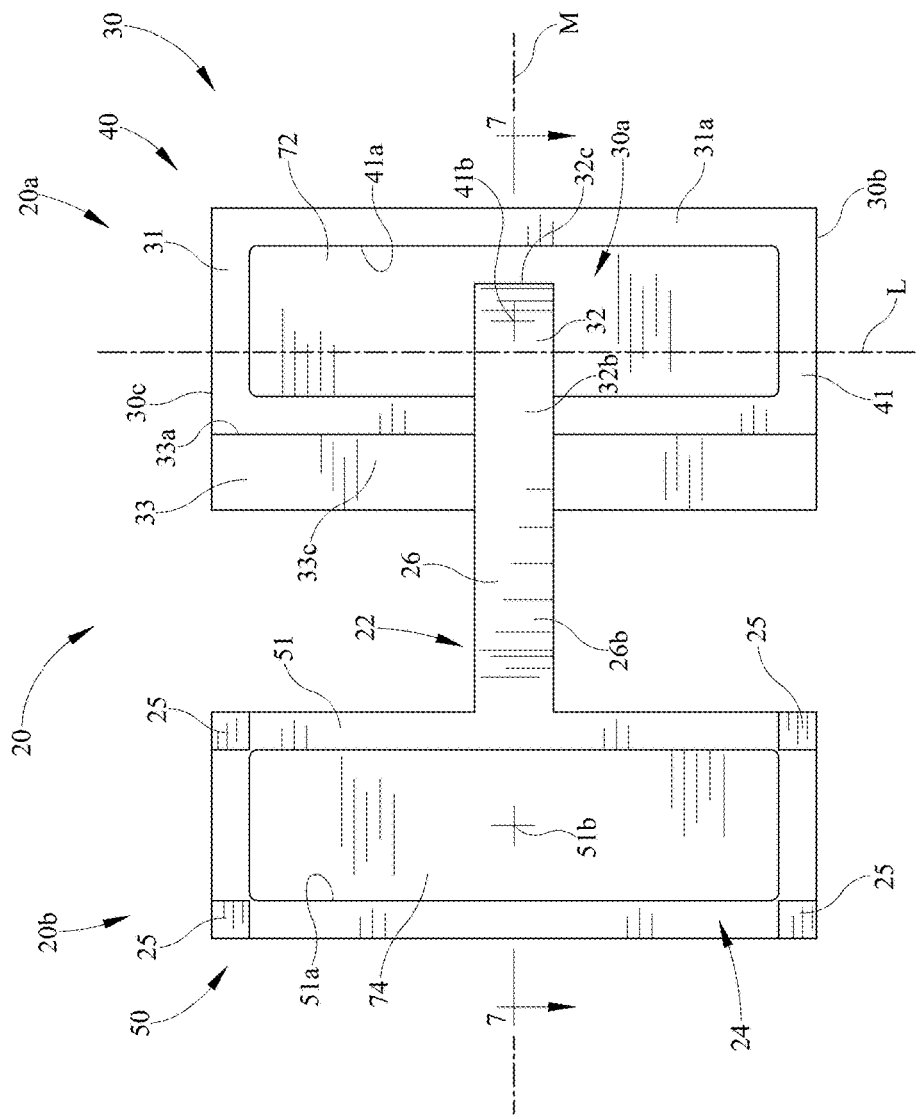
FIG. 6 is a top view of the embodiment of FIG. 2.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative embodiments are possible.

As shown in FIGS. 1-11D, a reusable magnetic device or temporary reusable vehicular latch 20 maintains the relationship between an opening element 90 and a fixed element 80 of a vehicle 10. The reusable magnetic device 20 utilizes one or more magnets 72, 74 to temporarily secure the opening element 90 to the fixed element 80 when in a closed position (FIGS. 1 and 9), while still allowing the opening element 90 to be positioned in an open position relative to the fixed element 80. One application of use for this reusable magnetic device 20 includes the opening element 90 being a vehicular door pivoting relative to the fixed element 80 of the vehicle. The reusable magnetic device 20 may be non-coated for use in caustic, water, or media blasting cleaning applications or may include a non-stick paint release coating to the exposed surfaces such as, but is not limited to, TEFLON. The through opening 22*a* within a bracket body 22 may allow for hanging the reusable magnetic device 20 for application of a coating or the like during its construction. The reusable magnetic device 20 may be installed and removed by hand without the use of tools. The magnets 72, 74 of the reusable magnetic device 20 may include, but is not limited to, a pull force range of 5-50 lbs. or customized to a user's requirement. The pull force range may be dependent on the make, model, and manufacturer of the vehicle. The reusable magnetic device 20 may also withstand applications involving high temperatures, but is not limited to, up to about 450 degrees Fahrenheit. The one or more magnets 72, 74 used may be, but is not limited to, Rare Earth Neodymium up to about 250 degrees Celsius and/or Rare Earth Samarium Cobalt up to about 350 degrees Celsius. The reusable magnetic device bracket body 22 may be, but is not limited to, metal and/or plastic in some embodiments. The choice of materials described herein is not deemed to be limiting. Although the reusable magnetic device 20 is shown in detail in the drawings, it is merely representative of one embodiment, and it is to be understood that there are a variety of shapes, sizes, orientations, constructions, and quantities which may be used and still be within the scope of the teachings herein. For example, one embodiment of the reusable magnetic device 20 may be constructed for a particular fixed element and opening element of one make and model and another embodiment may be constructed for another make and model with different characteristics.

The reusable magnetic device 20 as shown in the figures illustrates bracket body 22 having opposing ends or magnetic attachments to secure to their respective metallic opening element 90 or fixed element 80 when in the closed position. The opposing ends include a first end 20*a* and a second end 20*b*, with each end including a respective one or more magnets 72 and 74. At least one of the opposing ends 20*a*, 20*b* includes a receiving slot 30*a* defined by one or more U-shaped members 30. As shown in one embodiment, the first end 20*a* includes the U-shaped member 30 defining the receiving slot 30*a* that engages or slidingly receives a substantially planar flange 82 of the vehicle fixed element 80. The U-shaped member 30 may include a first side member 31, an opposing second side member 32 spaced away from the first side member 31, and a bottom side member 33 interconnecting the first side member 31 and second side member 32. The receiving slot 30*a* includes a longitudinal axis L and may be substantially perpendicular to the midplane M, or the general direction of the door 90 pivoting away from the vehicle fixed element 80. The receiving slot 30*a* extends through the top surface 30*b* and bottom surface 30*c* of the first end 20*a*. At least one of the members 31, 32, and/or 33 defining the U-shaped member 30 includes one or more first magnets 72. As is shown in one embodiment, the first side member 31 includes one or more first magnets 72. The one or more first magnets 72 may be recessed, disposed within, or attached to an inner abutment surface 31*a* of the first side member 31 that contacts the fixed element 80 on one side. Another inner abutment surface 32*a* of the second side member 32 contacts the other outwardly facing side of the fixed element 80 received in the receiving slot 30*a*. However, it should be understood that the one or more first magnets 72 and/or the abutment surface 31*a* may contact the fixed element 80. The bottom side member 33 includes an inner abutment surface 33*a* that may contact the free end surface of the fixed element 80. The end surface of the fixed element 80 connects the one side and the opposing facing other side of the fixed element 80. The receiving slot 30*a* defined by inner abutment surfaces 31*a*, 32*a*, and 33*b* reduce the likelihood of the device to reposition along one or more axis during operation of the vehicular door between the open and closed positions, while in the open position, and/or while in the closed position. The surface area of the second side member's 32 inner abutment surface 32*a* may be less than the surface area of the bottom side member's 33 inner abutment surface 33*a* and/or the first side member's 31 inner abutment surface 31*a*. The one or more abutment surfaces 24 of the second end 20*b* may be parallel to the inner abutment surface 31*a* and 32*a* of the first side member 31 and/or the second side member 32, respectively. However, the abutment planes of contact may be not parallel to each other in some embodiments. Further, the second end 20*b* may include one or more second magnets 74, which may be recessed, disposed within, or attached to the abutment surface 24. The bracket body 22 may include one or more members 26 interconnecting the first end 20*a* and the second end 20*b*. Member 26 may position the ends 20*a* and 20*b* in a variety of positions relative to each other along one or more axis. In the embodiment shown, the member 26 may be curved with an outer curve 26*a* and an inner curve 26*b* spacing the magnetic abutment surfaces in different planes, these planes may be parallel as previously discussed and separated by a distance along one or more axis. It should be understood that the member 26 may orientate the magnetic abutment surfaces of the embodiment shown in various other orientations relative to each other to accommodate manufacturer, make, and model.

As shown in the figures, the first end 20*a* and second end 20*b* may also be described as having receptacles for retaining their respective magnets 72, 74. The first end 20*a* includes a first magnetic receptacle 40 and the second end 20*b* includes a second magnetic receptacle 50. The first side member 31 of the first end 20*a* may correspond to the first magnetic receptacle 40. Each one of the first and second magnetic receptacles 40, 50 includes an outer periphery 41, 51 defining an opening 41*a*, 51*a* with a central axis 41*b*, 51*b*. In the embodiment shown, the first and second magnetic receptacles 40 and 50 may be, but is not limited to, rectangular in shape. The openings 41*a* and 51*a* may face in the same generally direction as shown in one embodiment. The first magnetic receptacle 40 can receive one or more first magnets 72 and the second magnetic receptacle 50 can receive one or more second magnets 74. These magnets may be stacked as shown, but may alternatively be orientated in a variety of relationships relative to each other if more than one magnet is used. For example, each magnet does not have to be received within an opening as is shown but may be adhered or connected to one or more surfaces to apply magnetic forces to either element.

Figure 9:
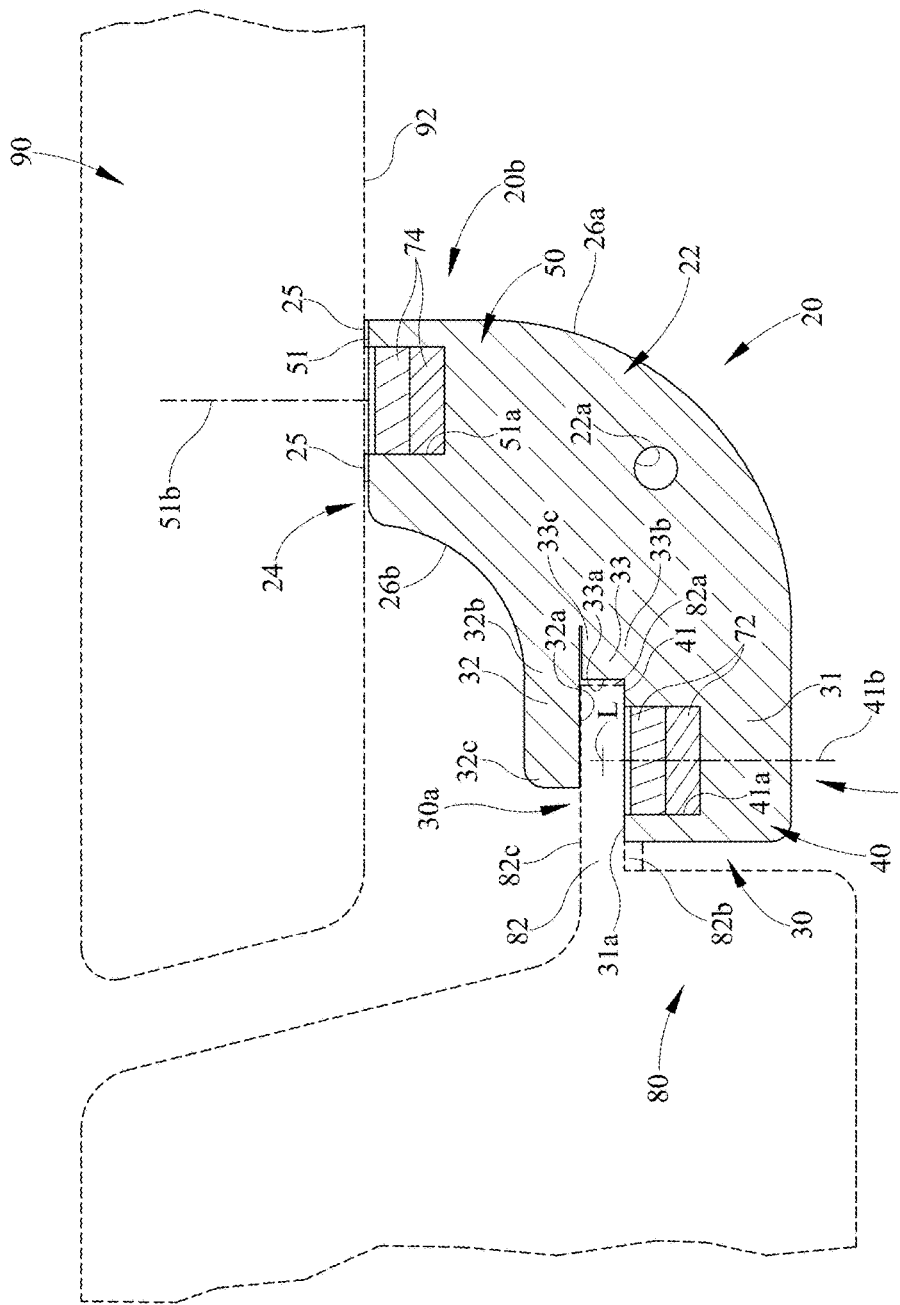
FIG. 9 is a cross sectional view of the reusable magnetic device of FIG. 7 illustrating the device generally installed on a vehicle with the vehicle door or opening element in the closed position as in FIG. 1.

As illustrated, the outer periphery 41 and 51 of the first magnetic receptacle 40 and/or the second magnetic receptacle 50 may include a contacting or abutment surface 31*a* and 24 respectively. The abutment surfaces 31*a* and 24 may contact either the fixed element 80 and/or opening element 90. The abutment surfaces may be a variety of shapes, sizes, orientations, constructions, and quantities. For example, at least one of the outer periphery 41 and 51 may also include one or more pads or protrusions 25. Further, one or more abutment surfaces or outer peripheries may include pads 25 or similar structure to minimize the contact surface area between the reusable magnetic device 20 and the vehicle fixed element 80 and opening element 90. In the embodiment shown, the abutment surface 24 may include one or more pads 25. In some embodiments, the abutment surfaces do not have pads. One or more pads 25 outwardly extends away from the abutment surface 24 or outer periphery 51 of at least the second magnetic receptacle 50. Each pad 25 is more specifically shown at each corner of the rectangular shaped outer periphery 51 of the second magnetic receptacle 50. If the pads 25 are used, the pads 25 may reduce the surface area contact of the abutment surface 24, bracket body 22, outer periphery 51, and/or second magnets 74 that contacts or abuts the opening element 90. The pads 25, instead of the entire abutment surface 24, may abut the opening element as shown in FIGS. 1 and 9 when the opening element 90 is in the closed position. Reducing the surface area contact may reduce the likelihood of contamination and chipping paint. The pads 25 are shown as square in shape but may be any quantity, shape, construction, or position along the outer periphery or surface facing the vehicle elements. Further as opposed to what is shown in one embodiment, the first magnetic receptacle 40 may include one or more pads 25.

Figure 7:
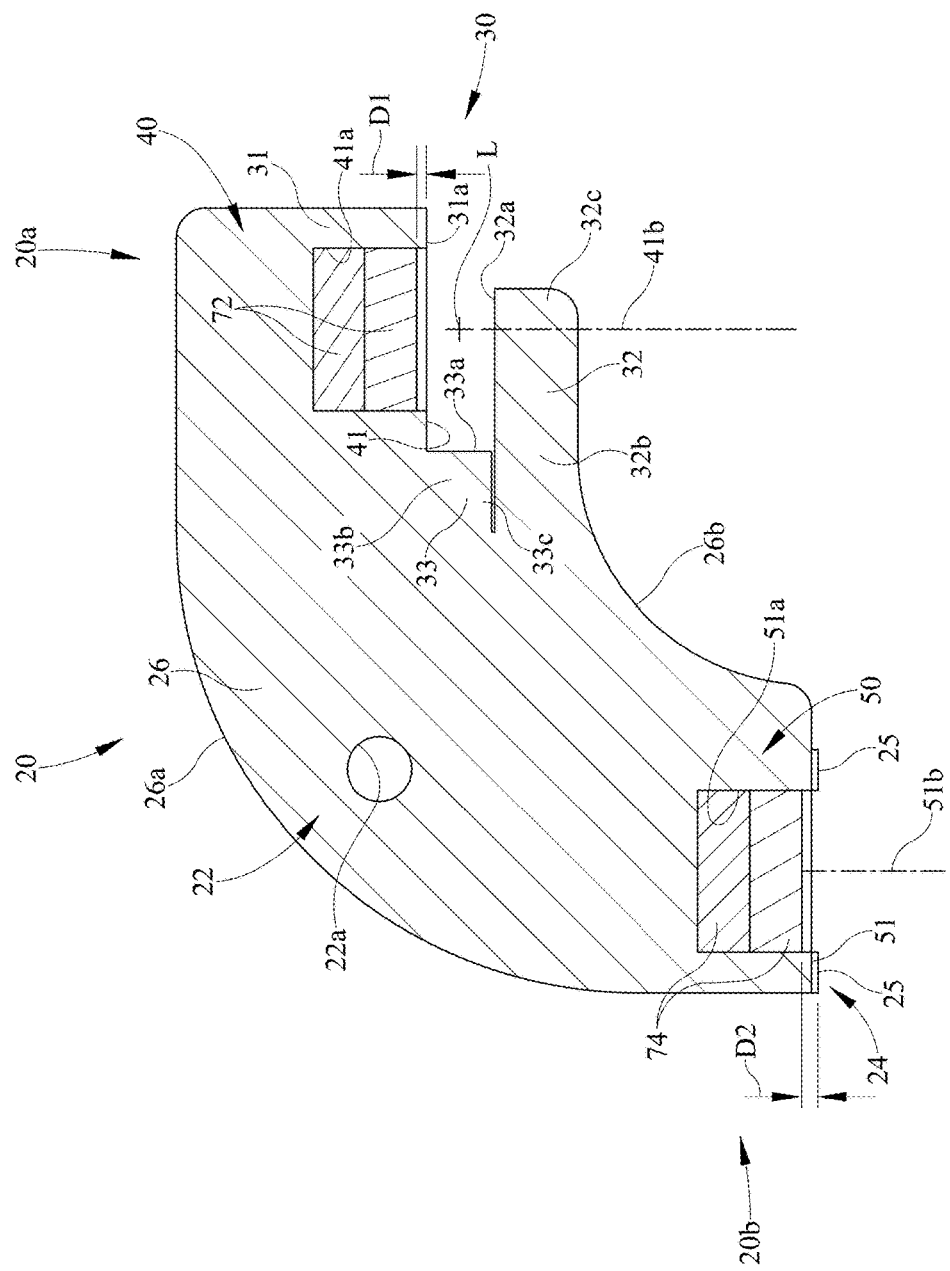
FIG. 7 is a cross sectional view of the embodiment of FIG. 6 taken along line 7-7.
Figure 8:
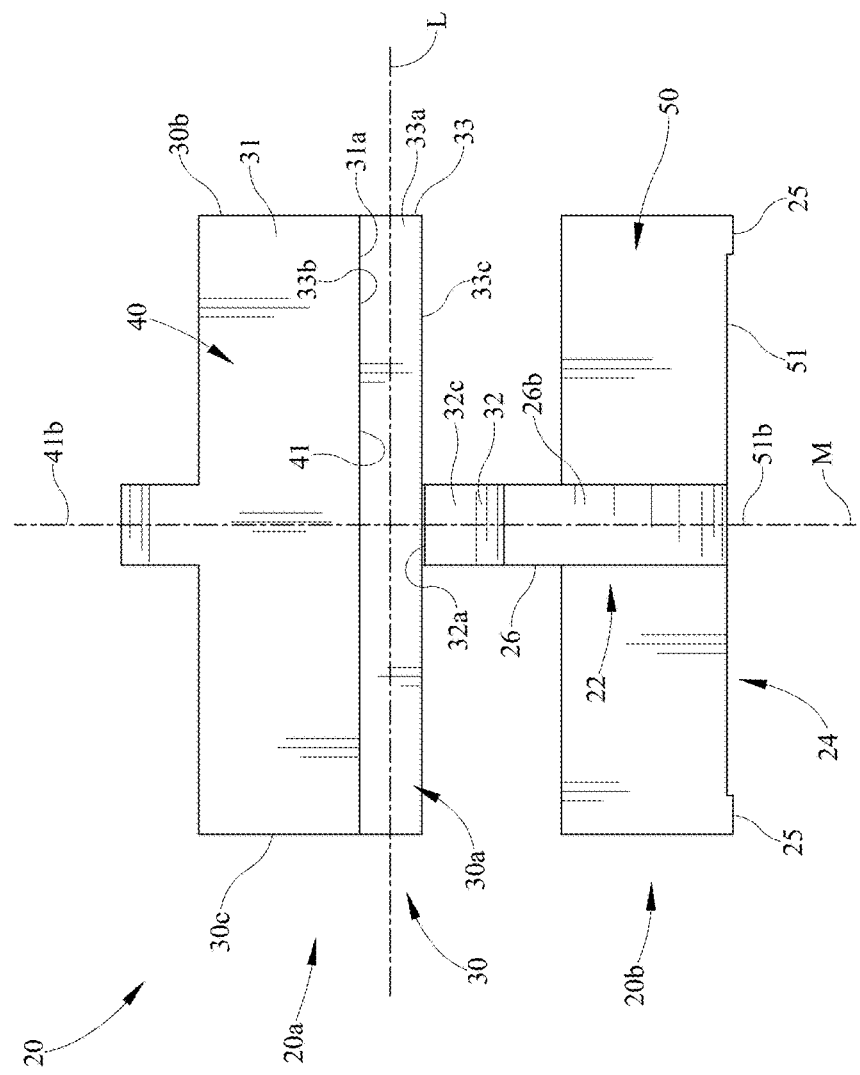
FIG. 8 is a rear view of the embodiment of FIG. 2.

In one embodiment shown and best illustrated in at least FIG. 7, the inner abutment surface 31*a* and abutment surface 24 containing the magnets 72 and 74, respectively, may be substantially parallel to each other. The respective magnets and abutment surface can magnetically attach to similarly orientated and substantially parallel surfaces of the vehicle as shown in FIGS. 1 and 9. The central axis 41*b* and 51*b* of each opening 41*a* and 51*a*, respectively, are also aligned in substantially the same midplane M. The central axis 41*b* and 51*b* may be substantially parallel to each other. Further, although the abutment surfaces with magnets of each end are in different planes, it should be understood that the abutment surfaces of each first and second magnetic receptacles may be orientated in a variety of positions relative to each other to attach to corresponding respective surfaces of the fixed element 80 and opening element 90 of a variety of vehicular make and models. For example, but is not limited to, the plane of the abutment surfaces 31*a* and 24 may not be parallel along the midplane M such that the central axis 41*b*, 51*b* of each opening 41*a*, 51*a* is angled relative to each other, the central axis 41*b*, 51*b* may be offset out of the midplane M but still remain to be parallel, and/or one of the central axis or abutment faces may be transverse to the midplane M.

Although not shown, the first magnetic receptacle 40 may be used without the L-shaped member that includes the second side member 32 and bottom side member 33. However, if the L-shaped member is used to create the receiving slot 30*a* as described above, it may reduce the movement of the device relative to the opening element 90 and the fixed element 80 during use. As is shown in the embodiment, the L-shaped member projects outwardly away from the first magnetic receptacle 40. The structure defining the receiving slot 30*a* may resist the shifting of the device in a variety of directions along one or more axis. For example, the first end 20*a* when attached to the fixed element 80 may resist at least pivoting about the longitudinal axis L and/or the central axis 41*b*. As shown in one embodiment in FIG. 2, the first end 20*a* receiving slot 30*a* receives or impinges movement of the corresponding fixed element flange 82 to help maintain contact with the first magnetic receptacle 40. A proximal end 33*b* of the bottom side member 33 projects from at least one side of the inner abutment surface 31*a* or outer periphery 41 adjacent the first magnetic receptacle opening 41*a* initially along the direction of the central axis 41*b* and a distal end 33*c* of the bottom side member 33 engages a proximal end 32*b* of the second side member 32. The bottom side member 33 may extend longitudinally in the direction of the longitudinal axis L from the top surface 30*b* to the bottom surface 30*c*, or portions thereof. In one embodiment shown, the proximal end 32*b* of the second side member 32 projects from the bottom side member 33 in a direction away from the second magnetic receptacle 50 or substantially parallel to the inner abutment surface 31*a* for a distance such that a distal end 32*c* extends across at least a portion of the first magnetic receptacle 40 or outer periphery 41. As is shown in the embodiment, the second side member 32 may be positioned along the midplane M and spaced from the first magnetic receptacle abutment face 31*a*. Although the side members 31-33 are shown in detail in the drawings, it is to be understood that there are a variety of shapes, sizes, orientations, constructions, and quantities which may be used and still be within the scope of the teachings herein. For example, although the second side member 32 may extend only a portion of the distance between the top surface 30*b* and bottom surface 30*c* along the direction of the longitudinal axis L, the second side member 32 may be continuous between the top surface 30*b* and the bottom surface 30*c*. Further unlike as shown, side members 31-33 may not be perpendicular to each other in order to accommodate the vehicle's characteristics.

Although the first and second ends 20*a* and 20*b* are shown in detail in the drawings, it is merely representative of one embodiment, and it is to be understood that there are a variety of shapes, sizes, orientations, constructions, and quantities which may be used and still be within the scope of the teachings herein.

The force of the magnets may be adjusted not only by selecting the type of magnets, such as the grade, size, and/or the number of magnets used, however the force of the magnets applied to the fixed element and/or opening element may be adjusted by varying a distance from one or more magnets to their respective abutment surface of either one of the first end 20*a* and second end 20*b*. As best shown in FIG. 7, the one or more first magnets 72 may be spaced a first distance D1 from the inner abutment surface 31*a* or outer periphery 41 while the one or more second magnets may be spaced a second distance D2 from the abutment surface 24, more specifically the contacting surface of the pads 25 if used. The first distance D1 and the second distance D2 do not have to be equal to each other as shown. Further, the distance may be zero or extend outwardly beyond their respective abutment surface. Also, it should be further understood that the magnetic force at the opposing ends 20*a* and 20*b* do not have to be equal to each other. For example, the first end 20*a* may have a magnetic force that engages the fixed element 80 that is greater than the magnetic force of the second end 20*b* that releasably engages the opening element 90.

Figure 10A:
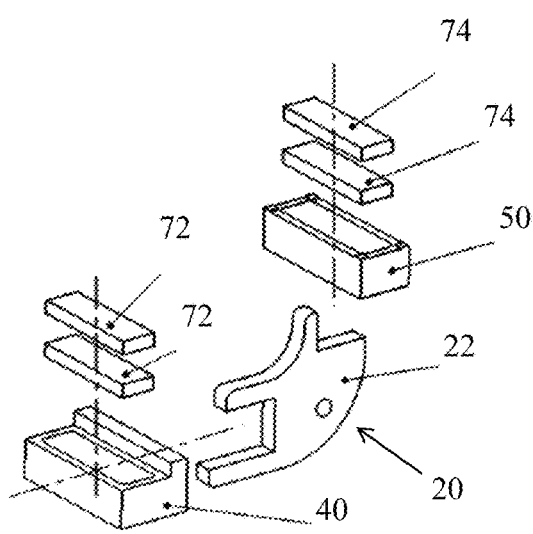
FIG. 10A is an additional side by side view of one embodiment illustrating an exploded view into components
Figure 10B:
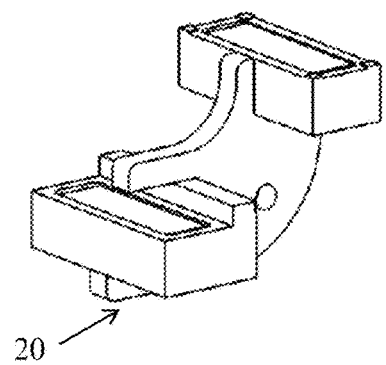
FIG. 10B is an assembled view of the embodiment of FIG. 10A assembled view.
Figure 11A:
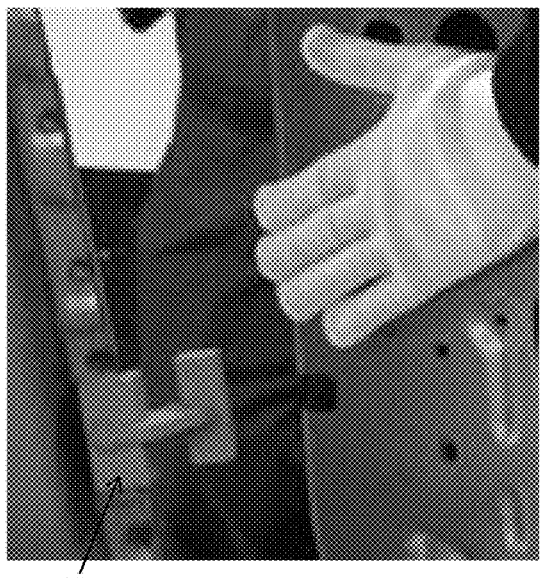
FIGS. 11A-11D are multiple views of the useable device installed on a fixed element with the opening element positioned relative thereto.
Figure 11B:
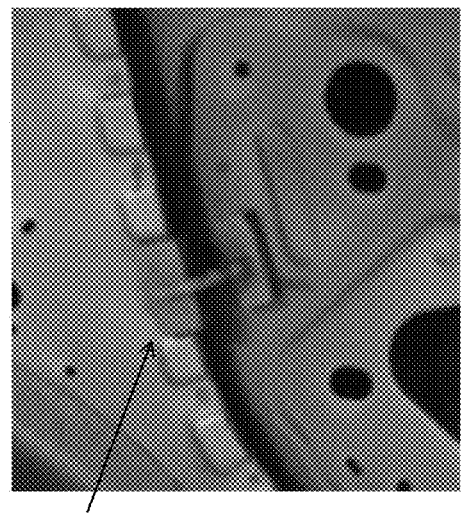
Figure 11C:
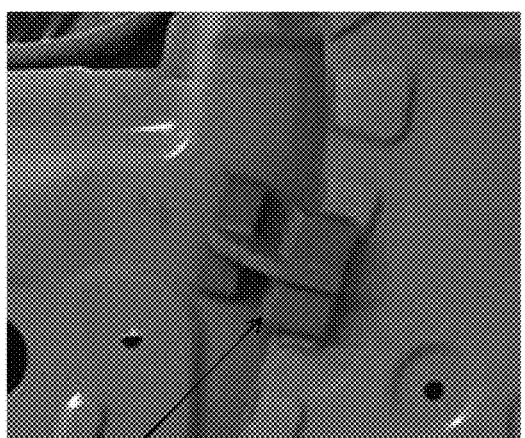
Figure 11D:
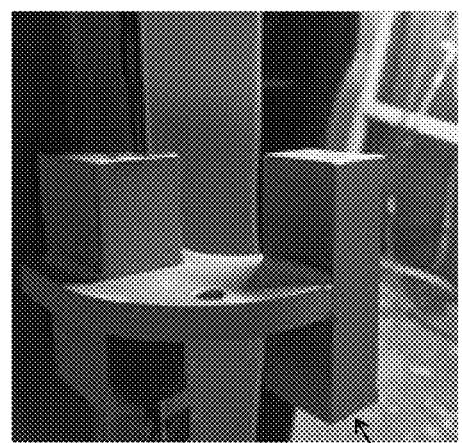

In some embodiments such as one shown in FIGS. 10A and 10B, the device 20 may include, but is not limited to, one or more characteristics. The device 20 may be self-affixing or retaining such as by the dual magnetic circuit design. Alternatively in some embodiments, a single magnetic circuit design may be used. The device 20 may be installed with no tools, such as a slip fit install. The device 20 may be universal per vehicle model. The device 20 may be reusable. Alternatively, the device may be a one time use. The pull force range may be 5-50 lbs, application specific, or vary by the circuit design. The device may operate at high temperature. A small footprint or overall assembly size may be achieved. Further, bonding agents and contaminates may be reduced. The device may include an adjustable fit to a variety of applications. The magnetic circuit design of each circuit, if one or both used, may have utilization of a magnet grade combination such as but not limited to force and temperature adjustability. Further, the steel circuit may be adjusted such as, but is not limited to, the path and air gaps (D1 and/or D2). The surface treatments of some embodiments may be bare (non coated) for use in caustic cleaning applications. Further, a non-stick paint release coating may be applied to one or more exposed surfaces. The device may include a variable anti-tip feature with adjustments in one or more axis. The first end may include an anti-rock feature. The second end may include a reduced paint surface contact zone. The magnets may be Rare Earth Neodynium up to 250 C in some embodiments and/or Rare Earth Samarium Cobalt up to 350 C. The above mentioned characteristics are not to be considered limiting.

In use, the vehicle 10 on the production line includes an opening element 90 such as the vehicular door. One or more reusable magnetic devices 20 may be placed on at least one door or more than one door. For example, one reusable magnetic device 20 per door of a vehicle. A single embodiment of the reusable magnetic device 20 may be used on all doors of a specific vehicle, make and model. The operator installs the reusable magnetic device 20 when the door 90 is in the open position. The device's receiving slot 30a is slid over the weather seal lip or flange 82 adjacent the door jamb generally opposite the door hinge or at a substantially flat door 90 landing area. The weather seal flange 82 may be described as the location where a door gasket is attached. The inner abutment surface 33a of the bottom side member 33 may make contact with distal end 82a of the flange 82. The first side member 31 with one or more first magnets 72 and second side member 32 straddle the flange 82 such that the inwardly facing inner abutment surfaces 31a, 32a, may make contact with the opposing sides 82b, 82c of the flange 82, respectively. The magnetic force of the one or more first magnets 72 magnetically anchor the reusable magnetic device 20 to the flange 82. The receiving slot 30a of the first end U-shaped member 30 engages the fixed element 80 when the opening element 90 is in both the open position and the closed position relative to the fixed element. The reusable magnetic device 20 and the multiple surface contact of the inner abutment surfaces 31a, 32a, and 33a reduce the likelihood of the device from changing its orientation to the fixed element 80 that may be caused by a variety of outside forces or vibrations during production line activities. With the first end 20a installed, the opposing second end 20b is aligned to make temporary contact with a substantially planar surface 92 of the door 90 when in the closed position (FIGS. 1 and 9). The magnetic force of the one or more second magnets 74 magnetically anchor the reusable magnetic device 20 to the opening element 90. The abutment surface 24 of the second end 20b is adapted to engage the opening element 90 when the opening element is in the closed position relative to the fixed element 80 and to be disengaged from the opening element 90 when the opening element is in the open position relative to the fixed element 80. The one or more second magnets 74 temporarily hold the door 90 closed until opened by the operator by using a sufficient force to overcome the magnetic force of the second end 20b to separate. Upon completion of use of the reusable magnetic device 20 for one vehicle 10, the operator merely pulls or slides the reusable magnetic device 20 away from the flange 82 with sufficient force to overcome the magnetic force of the one or more first magnets 72 to separate. Then the reusable magnetic device 20 may be installed again on another vehicle 10 on the production line. The location shown for attachment and/or orientation of the device when attached is not to be considered limiting. The reusable magnetic device 20 may be designed to fit in a variety of positions on a vehicle and thus accommodate the different attachment locations that may vary depending on the company, make, model for which it is being applied. For instance, the receiving slot 30a can be sized or shaped to fit a variety of thicknesses or shapes of a vehicle flange. Also for example, the second magnetic receptacle 50 may be positioned in a non-parallel position with the first magnetic receptacle 40 to abut a particular surface of the door that may not be substantially parallel to the flange 82. Further, although the embodiments show opposing ends in a fixed relationship relative to each other, it should be understood that the opposing ends may be adjustable along one or more axis via a pivot or rotational axis (not shown) therebetween. Also, it is understood that the reusable magnetic device 20 may be subjected to a variety of chemicals, substances, or conditions while on the production line. For instance, the reusable magnetic device 20 may be subjected to a variety of chemicals such as, but is limited to, being submersed in a Phosphate bath.

Further in use, a strip of tape or other type of material may be applied to one or more of the abutment surfaces of the reusable magnetic device 20. If a material is used that does not have an adhesive, it may be held in place between the magnetic abutment surface and the vehicle element. For example if tape is used, one or more pieces of tape can be secured to one or more surfaces of the reusable magnetic device 20 before installment onto the vehicle to protect the contact surface of the vehicle. The tape may be removed from the device and more tape be reapplied when the device is reused for the next vehicle. The tape may be manufactured by the 3M Company, such as SCOTCHBLUE painters tape.

Figure 12:
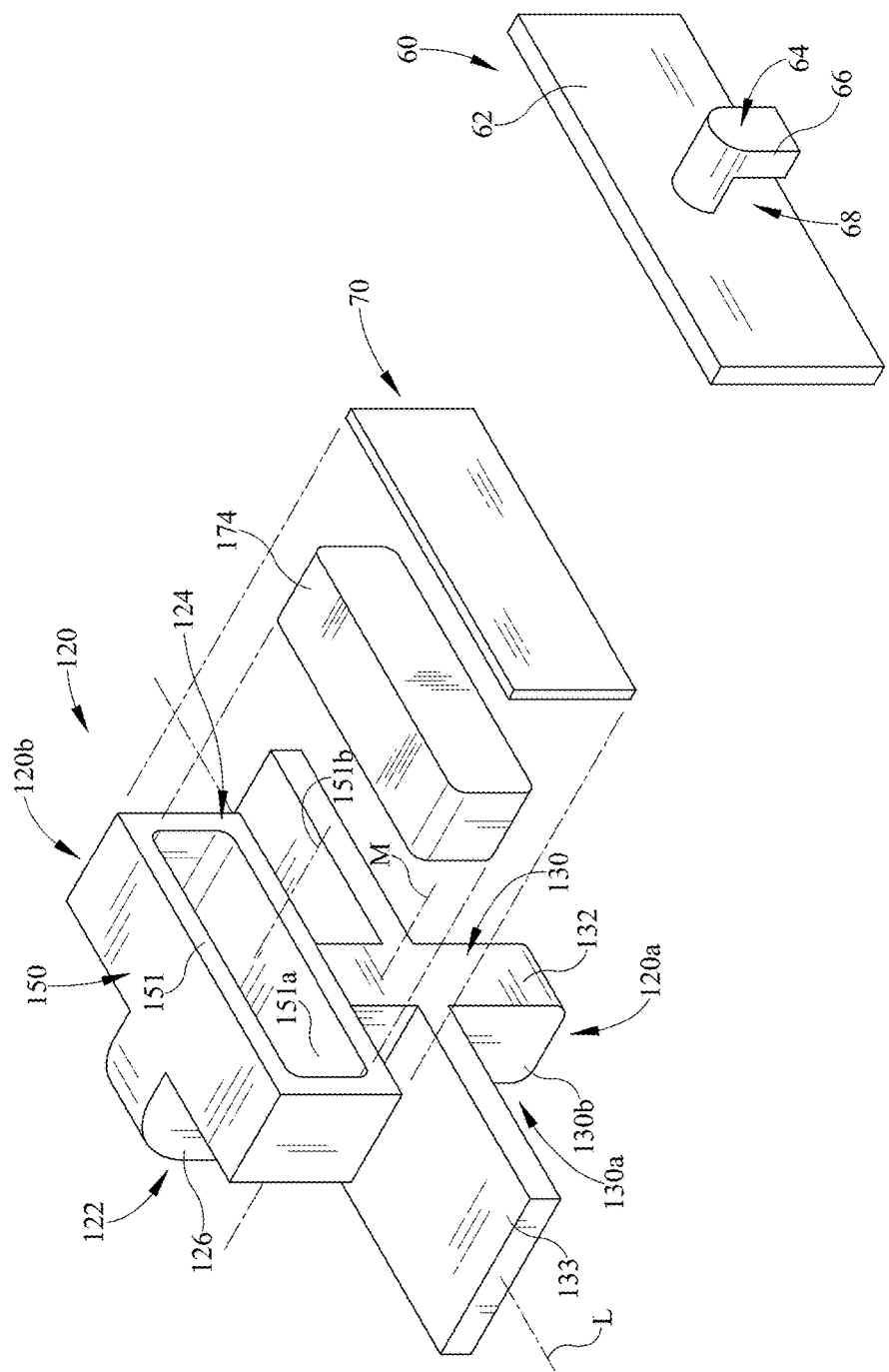
FIG. 12 is an exploded perspective view of another embodiment of the reusable magnetic device.
Figure 13:
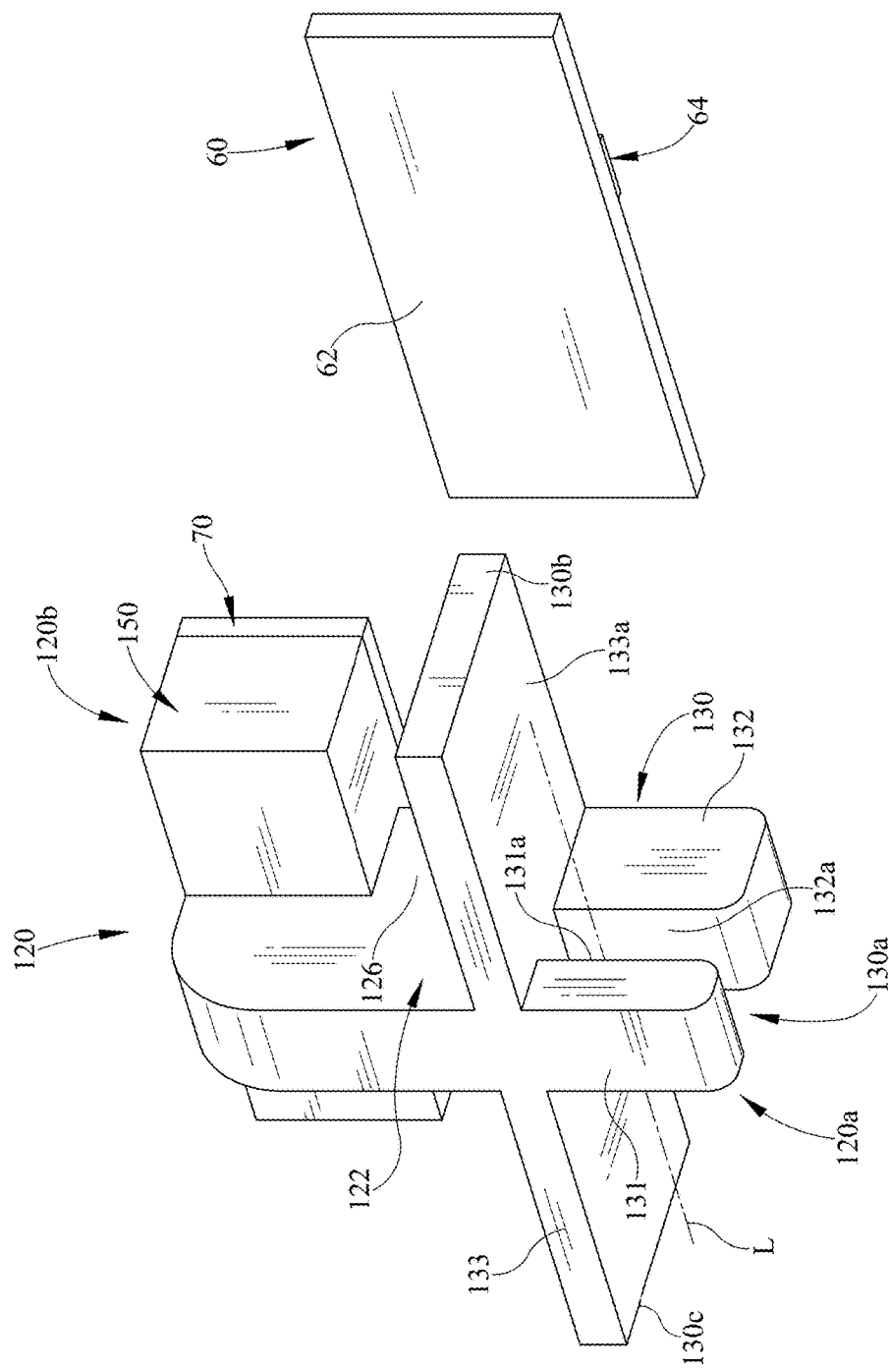
FIG. 13 is another exploded perspective view of the reusable magnetic device of FIG. 12, illustrating the cover attached to the first end of the device and a latch catch exploded away from the device.
Figure 14:
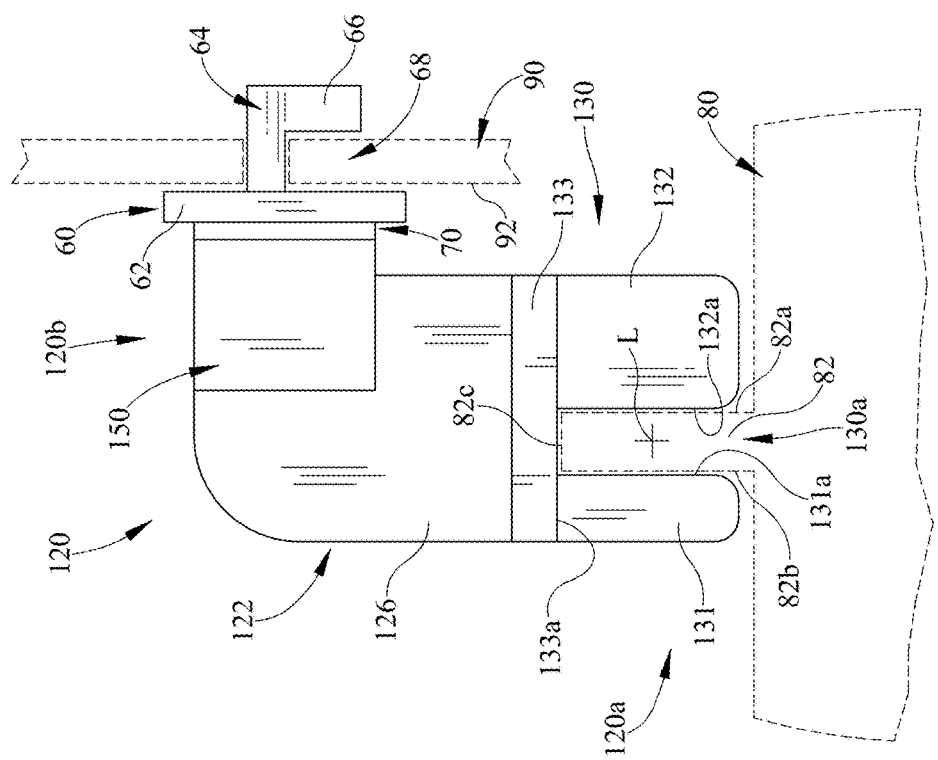
FIG. 14 is a side view of the reusable magnetic device of FIG. 12 illustrating the device generally installed on a vehicle with the vehicle door or opening element in the closed position.

FIGS. 12-14 illustrate one embodiment of the single circuit of a reusable magnetic device 120. The reusable magnetic device 120 includes at least one end having magnetic attachments to secure to their respective metallic opening element 90 or fixed element 80 when in the closed position and/or a respective latch catch 60 in some embodiments. The opposing ends include a first end 120a and a second end 120b, with at least one end including one or more magnets 174. The other of at least one of the opposing ends 120a, 120b may not include one or more magnets and be attached by a variety of methods other than by magnets. One embodiment not utilizing magnets may be an end that includes a receiving slot 130a defined by one or more U-shaped members 130. As shown in one embodiment, the first end 120a includes the U-shaped member 130 defining the receiving slot 130a that engages or slidingly receives a substantially planar flange 82 of the vehicle fixed element 80. The U-shaped member 130 may include a first side member 131, an opposing second side member 132 spaced away from the first side member 131, and a bottom side member 133 interconnecting the first side member 131 and second side member 132. The receiving slot 130a includes a longitudinal axis L and may be substantially perpendicular to the midplane M, or the general direction of the door 90 pivoting away from the vehicle fixed element 80. The receiving slot 130a extends through the top surface 130b and bottom surface 130c of the first end 120a. The inner abutment surface 131a of the first side member 131 contacts the fixed element 80 on one side. Another inner abutment surface 132a of the second side member 132 contacts the other outwardly facing side of the fixed element 80 received in the receiving slot 130a. The bottom side member 133 includes an inner abutment surface 133a that may contact the free end surface of the fixed element 80. The end surface of the fixed element 80 connects the one side and the opposing facing other side of the fixed element 80. The receiving slot 130a defined by inner abutment surfaces 131a, 132a, and 133b reduce the likelihood of the device to reposition along one or more axis during operation of the vehicular door between the open and closed positions, while in the open position, and/or while in the closed position. The surface area of the second side member's 132 inner abutment surface, bottom side member's 133 inner abutment surface 133a, and/or the first side member's 131 inner abutment surface 31a may be the same or different. The one or more abutment surfaces 124 of the second end 120b may be parallel to the inner abutment surface 131a and 132a of the first side member 131 and/or the second side member 132, respectively. However, the abutment planes of contact may be not parallel to each other in some embodiments. Further, the second end 120b may include one or more magnets 174, which may be recessed, disposed within, or attached to the abutment surface 124. The bracket body 122 may include one or more members 126 interconnecting the first end 120a and the second end 120b. Member 126 may position the ends 120a and 120b in a variety of positions relative to each other along one or more axis. In the embodiment shown, the member 126 may space the magnetic abutment surface in a plane or orientations parallel to the longitudinal axis A. It should be understood that the member 126 may orientate the magnetic abutment surface of the embodiment shown in various other orientations relative to the other non-magnetic abutment surface to accommodate manufacturer, make, and model.

As shown in FIGS. 12-14, the second end 120b may also be described as having a receptacle for retaining magnets 174. The second end 120b may include a magnetic receptacle 150. The magnetic receptacle 150 includes an outer periphery 151 defining an opening 151a with a central axis 151b. In the embodiment shown, the magnetic receptacle 150 may be, but is not limited to, rectangular in shape. The magnetic receptacle 150 can receive one or more magnets 174. One or more magnets may be stacked, but may alternatively be orientated in a variety of relationships relative to each other if more than one magnet is used. In the embodiment shown, one magnet is used. For example, each magnet does not have to be received within an opening as is shown but may be adhered or connected to one or more surfaces to apply magnetic forces to either element.

In use, one or more reusable magnetic devices 120 with at least one magnetic attachment end may be placed on at least one door or more than one door on the production line. As such the one magnetic end may attach to either the fixed element 80 or the opening element 90. In the one embodiment shown, the device's receiving slot 130a is slid over the weather seal lip or flange 82 adjacent the door jamb generally opposite the door hinge or at a substantially flat door 90 landing area. The inner abutment surface 133a of the bottom side member 133 may make contact with distal end 82a of the flange 82. The first side member 131 and second side member 132 straddle the flange 82 such that the inwardly facing inner abutment surfaces 131a, 132a, may make contact with the opposing sides 82b, 82c of the flange 82, respectively. The receiving slot 130a of the first end U-shaped member 130 engages the fixed element 80 when the opening element 90 is in both the open position and the closed position relative to the fixed element. With the first end 120a installed, the opposing second end 120b may be aligned to make temporary contact with a substantially planar surface 92 of the door 90 when in the closed position (similar to FIGS. 1 and 9). If used, a latch catch 60 may engage the second end 120b, and/or first end 102a, instead of directly contacting the door 90 as described in more detail below. The magnetic force of the one or more magnets 174 magnetically anchors the reusable magnetic device 120 to the opening element 90. The abutment surface 124 of the second end 120b is adapted to engage the opening element 90 when the opening element is in the closed position relative to the fixed element 80 and to be disengaged from the opening element 90 when the opening element is in the open position relative to the fixed element 80. The one or more magnets 174 temporarily hold the door 90 closed until opened by the operator by using a sufficient force to overcome the magnetic force of the second end 120b to separate.

In some embodiments, one or more reusable magnetic devices 120 may be used in applications that one or more portions of the fixed element 80 and/or the opening element 90 may be non-magnetic, ferrous, or non-ferrous, such as with an aluminum vehicular body or portions of the vehicular attachment areas of either element are non-magnetic, ferrous, or non-ferrous. As shown in FIGS. 12-14, some embodiments of the reusable magnetic device 120 may include a latch catch 60 to magnetically anchor at least one magnetic end of the device to a non-magnetic surface of the vehicle. It should be understood the latch catch 60 may still be used in magnetic applications. The latch catch 60 may include one or more metal members or plates 62 coming into proximity with the magnetic end of the device when the opening element 90 is in the closed position as shown in FIG. 14. In the embodiment shown, the latch catch 60 is secured to the opening element or door 90 and the device 120 engages and disengages therefrom. Alternatively, the latch catch 60 may be attached to the fixed element 80. The latch catch 60 includes a fastener or attachment 64 engaging the opening element 90. The one embodiment of the fastener 64 shown is an L-shaped tab 66 defining a receiving slot 68 between the tab 66 and plate 62. The tab 66 extends from the rear of the latch catch plate 62 and may be inserted into an opening or slot of the door 90 and secured by the receiving slot 68 retaining of portion of the door. Although the latch catch 60 is shown in detail in the drawings, it is merely representative of one embodiment, and it is to be understood that there are a variety of shapes, sizes, orientations, constructions, and quantities which may be used and still be within the scope of the teachings herein. For example, one embodiment of the fastener may be constructed to include a cam surface such that upon insertion, rotation of the cam surface engages the vehicle. Further in some embodiments, one or both ends of a device may engage a latch catch, respectively, in a variety of applications, either magnetic and/or non-magnetic. Further, in some embodiments a latch catch may assist in fixedly securing one end of the device to the respective element in both the closed and open positions.

In some embodiments, a reusable magnetic device 20, 120 may include one or more covers 70 disposed over the receptacle opening and/or other portions thereof of one or both ends. If used, the cover 70 may be disposed over at least a portion of the abutment surface 124 and therefore abutting the vehicle element and/or latch catch 60 as shown in the one embodiment of FIGS. 12-14. It should be understood that a cover does not have to be the abutment surface contacting the vehicle and/or latch catch 60. The cover 70 may reduce debris accumulation of one or more of the respective ends. Although the cover is shown as a substantially planar plate, other shapes, sizes, quantities, orientations, and constructions may be used and still be within the scope of the teachings herein. The cover may be of a non-magnetic material, such as but not limited to aluminum, plastic, or the like.

It is understood that while certain embodiments of the invention have been illustrated and described, it is not limited thereto except insofar as such limitations are included in the following claims and allowable functional equivalents thereof.

I claim:

1. A reusable magnetic vehicular latch comprising:
a bracket body having a first end and a second end, wherein said first end includes a U-shaped member, said U-shaped member having a first side member spaced from an opposing second side member and interconnected by a bottom side member therebetween, each of said first side member, said second side member, and said bottom side member has an inwardly facing inner abutment surface to define a receiving slot;
one or more magnets;
wherein said bracket body second end includes a receptacle receiving said one or more magnets, wherein said bracket body second end is adapted to engage at least one of an opening element or a fixed element when the opening element is in a closed position relative to the fixed element and said bracket body second end is adapted to be disengaged from the opening element when the opening element is in an open position relative to the fixed element;
wherein said receiving slot of said first end U-shaped member is adapted to engage the other of at least one of the fixed element or opening element when the opening element is in both the open position and the closed position relative to the fixed element; and
a latch catch having at least one metal member, wherein said latch catch is adapted to engage the at least one of the fixed element or the opening element in both the open position and the closed position and said bracket body second end magnetically engages said latch catch engaged to the at least one of the fixed element or opening element in the closed position and magnetically disengages from said latch catch engaged to the at least one of the fixed element or opening element in the open position.

2. The reusable magnetic vehicular latch of claim 1 wherein said bracket body first end includes a receptacle.

3. The reusable magnetic vehicular latch of claim 2 wherein said receptacle of said bracket body first end includes one or more magnets.

4. The reusable magnetic vehicular latch of claim 2 further comprising one or more covers disposed over an opening defined by said receptacle of said bracket body first end.

5. The reusable magnetic vehicular latch of claim 1 further comprising one or more covers disposed over an opening defined by said receptacle of said bracket body second end.

* * * * *